(12) United States Patent
Varone et al.

(10) Patent No.: US 6,671,583 B2
(45) Date of Patent: Dec. 30, 2003

(54) VACUUM SYSTEM INFORMATION NETWORK

(75) Inventors: John J. Varone, Seekonk, MA (US); Norbert W. Elsdoerfer, Warwick, RI (US)

(73) Assignee: Helix Technology Corporation, Mansfield, MA (US)

( * ) Notice: Subject to any disclaimer, the term of this patent is extended or adjusted under 35 U.S.C. 154(b) by 438 days.

(21) Appl. No.: 09/822,106

(22) Filed: Mar. 30, 2001

(65) Prior Publication Data

US 2002/0143411 A1 Oct. 3, 2002

(51) Int. Cl.[7] .......................... G05D 7/00; G05D 11/00
(52) U.S. Cl. ................... 700/282; 700/19; 700/170; 700/48; 700/281; 700/275; 709/223; 709/225; 709/224; 702/45; 702/46; 702/49; 73/1.16; 73/1.36
(58) Field of Search .................. 700/1, 48, 19–20, 700/90, 170, 282, 281, 275, 289; 709/223, 224, 225; 702/45, 46, 47, 48, 49; 73/1.16, 1.17, 1.36

(56) References Cited

U.S. PATENT DOCUMENTS

| | | | | |
|---|---|---|---|---|
| 5,003,522 A | * | 3/1991 | Dolby | 369/44.32 |
| 5,710,708 A | | 1/1998 | Wiegand | 364/470.1 |
| 5,890,081 A | * | 3/1999 | Sasaki | 701/37 |
| 5,978,753 A | | 11/1999 | Eidson | 702/188 |
| 6,154,086 A | * | 11/2000 | Manolescu | 327/419 |
| 6,323,707 B1 | * | 11/2001 | Arai | 327/178 |

FOREIGN PATENT DOCUMENTS

| | | |
|---|---|---|
| DE | 42 35 186 | 4/1994 |
| EP | 0 809 164 | 11/1997 |
| WO | WO 99/13388 | 3/1999 |

OTHER PUBLICATIONS

Kissmer, M., "TCP/LP Connects Worlds," *Engineering and Automation*, Siemens Aktiengesellschaft,Berlin, DE, 19 (1/2):18–19 (1997).

* cited by examiner

*Primary Examiner*—Ramesh Patel
(74) *Attorney, Agent, or Firm*—Hamilton, Brook, Smith & Reynolds, P.C.

(57) ABSTRACT

A vacuum network control system includes a vacuum network controller hub communicating over a public high-speed network, where the hub has an address registered with respect to the non-local network and communicates over a first local high-speed network. Vacuum network controllers (VNCs) communicate with the hub over the first local network. Each VNC has a dynamically assigned local address and communicates with at least one component intrabus module over a second local high-speed network. Each module has a dynamically assigned local address and further communicates with one or more monitor and control end units over a local device network. Each monitor and control end unit has a dynamically assigned address. Monitor and control end units include taps, which provide at least one of analog, digital or serial I/O, and components, for example, vacuum pumps. Device addresses can be dynamically assigned based on unique identification information sent by the device upon the device's initialization, where the device's assigned local address is transmitted back to the device in response.

28 Claims, 7 Drawing Sheets

VACUUM SYSTEM INFORMATION NETWORK

BACKGROUND OF THE INVENTION

FIG. 1 is a schematic diagram of a system employing a vacuum pump network 18 such as Helix Technology Corporation's On-Board® Information Network. A network interface terminal (NIT) 12 connects via the network 18 to one or more pumps in a cluster tool. The illustrative system of FIG. 1 comprises various pumps including a cryopump 20, a waterpump 22 and a turbo and water pump combination 24.

In addition, the NIT 12 interfaces with a tool host controller 4 via an RS-232 connection 6. The NIT 12 can also connect to other systems such as a central control station 8 via a central control link 10 and to a service terminal 16 via a service link 14.

The On-Board® NIT 12 supports only vacuum components that have an On-Board interface. Third-party sensors, which cannot be connected to the NIT 12, must be connected directly to the tool host controller 4, thus placing more burden on the tool host controller 4.

SUMMARY OF THE INVENTION

Each time a new component such as a pump is added to the system, it must be manually assigned an address, for example, by setting switches on the component, and the NIT must be reconfigured so that it is made aware of the new component.

The present invention replaces or supplements the vacuum pump network with a more flexible vacuum information network.

One feature of an embodiment of the present invention is a network vacuum controller hub or link that has two TCP/IP interfaces: one for connecting to a network which may be a public, or non-local, network, for which the vacuum network controller hub has a registered TCP/IP address, and one for connecting to a private LAN at the vacuum system site. Devices on the LAN are assigned local addresses by the vacuum network controller hub when they start up. The outside world communicates via the link unit, which determines to which device connected to the LAN each message should be forwarded. The devices include, but are not limited to, hubs, vacuum pump controllers and taps which connect to components.

According to one embodiment of the invention, a vacuum control network system includes a vacuum network controller hub communicating over a non-local high-speed network, such as an ethernet-based network, where the hub has an address registered with respect to the non-local network and communicates over a first local high-speed network, such as an ethernet LAN. A plurality of vacuum network controllers (VNCs) communicate with the hub over the first local network. Each VNC has a dynamically assigned local address and communicates with one or more interface modules over a second local high-speed network. At least one interface module communicates with a VNC over the second local high-speed network.

Interface modules may have dynamically assigned local addresses.

In one embodiment of the present invention, at least one interface module communicates directly with a vacuum pump. At least one end unit communicates with an interface module over a module interface bus. The end unit may have a dynamically assigned address.

At least one embodiment of the present invention also includes one or more module hubs, where communication between an interface module and plural end units is through the at least one module hub.

An end unit may be a tap, wherein the tap connects to a component using digital I/O, analog I/O or a serial link. Alternatively, an end unit may be a component, such as a vacuum pump. An end unit may perform a monitor/control function.

In one embodiment, the vacuum network controller hub comprises a configuration map which describes those VNCs, modules and end units that the vacuum network controller hub controls.

In one embodiment, the non-local network is a public network and the first and second local networks are private networks. The high-speed networks, for example, can use TCP/IP over ethernet. The first and second local networks may utilize a fiber optic network, a wire network, a wireless network, or a combination.

In one embodiment, a VNC's address is dynamically assigned by the hub

In one embodiment, a device's dynamically assigned address is determined based on unique identification information, such as a serial number, sent by the device upon the device's initialization, the device's assigned local address being transmitted back to the device in response, a device being one the group of: a VNC and a module.

In one embodiment, the vacuum network controller hub performs supervisory control and data acquisition functions.

In one embodiment, a VNC is associated with a cluster tool, and an interface module is associated with a vacuum chamber.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
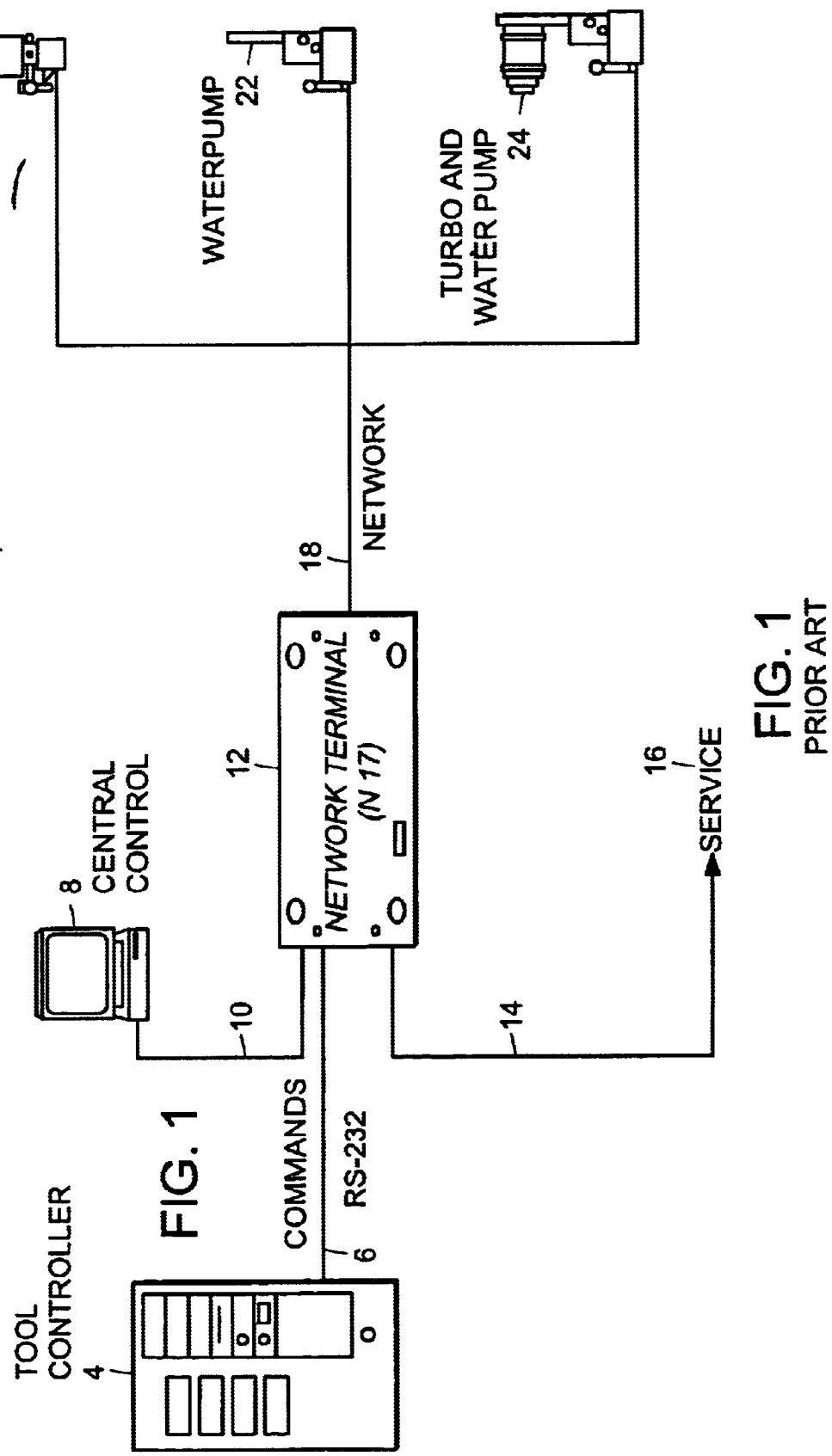
FIG. 1 is a schematic diagram of a prior art system employing a network interface terminal.
Figure 2:
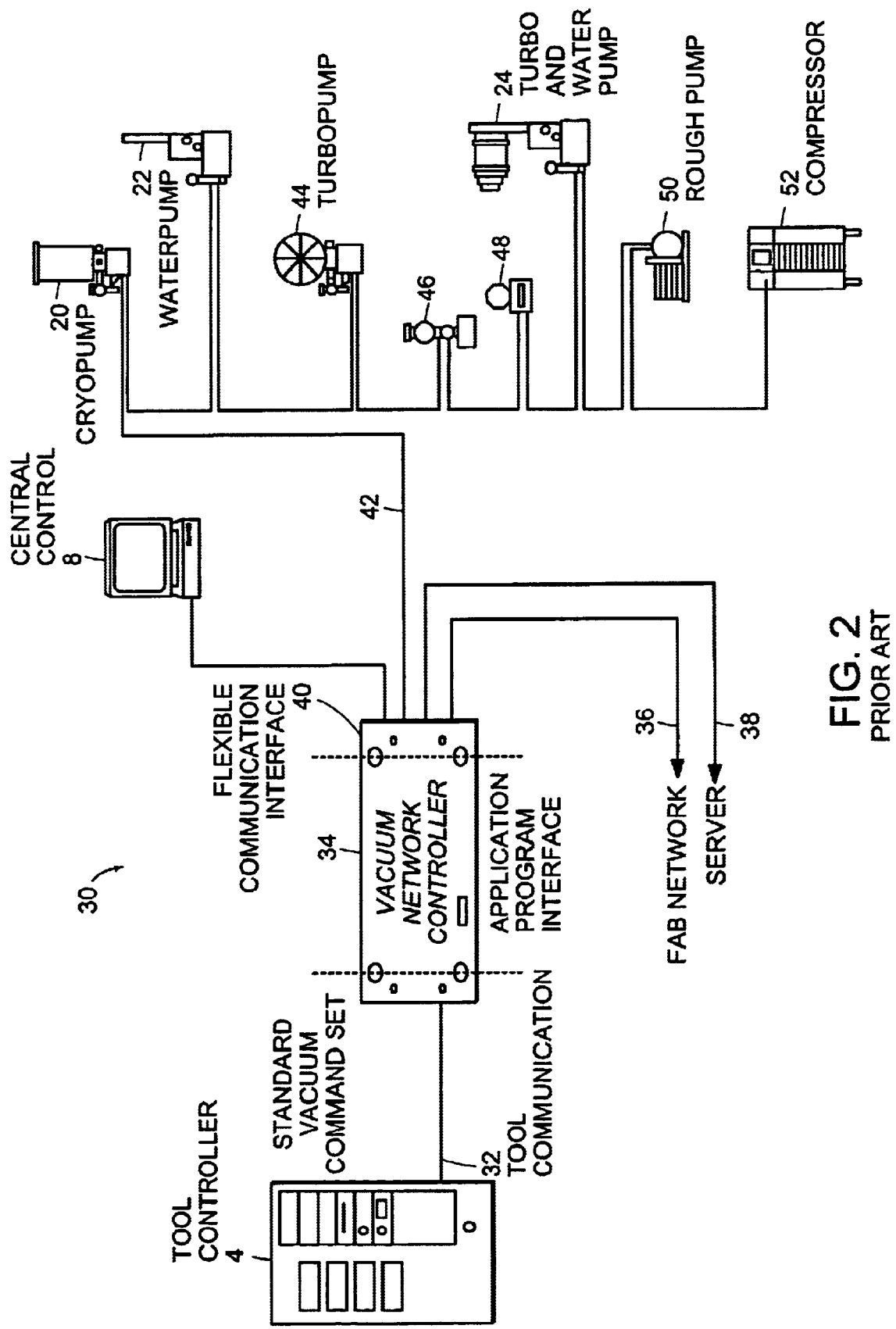
FIG. 2 is a schematic diagram of a prior art system employing a vacuum network controller.

FIG. 2 is a schematic diagram of a vacuum system 30 which is improved over the system of FIG. 1. A vacuum network controller (VNC) 34 takes the place of the NIT 12 of FIG. 1. A VNC is described more fully in application Ser. No. 09/114,549, filed Jul. 13, 1998, entitled "Vacuum Network Controller," which is incorporated by reference herein in its entirety. The VNC 34 communicates with the tool host controller 4 over a tool communication link 32, which is not limited to just RS-232 as was the connection 6 of FIG. 1. Using a flexible communication interface 40, the VNC 34 communicates with a central control station 8 over any of a variety of protocols. In the illustrative system of FIG. 2, the VNC 34 also interfaces with a fabrication facility network 36 and with a server 38.

The VNC 34 communicates over a daisy-chained serial bus 42 such as a BitBus with a plurality of vacuum pumps 20, 22, 24, 44 and other components such as valves 46, gauges 48, rough pumps 50 and compressors 52. A disadvantage of this system is that to insert a new component into the middle of the bus 42, connections between the bus and components must be broken.

Figure 3:
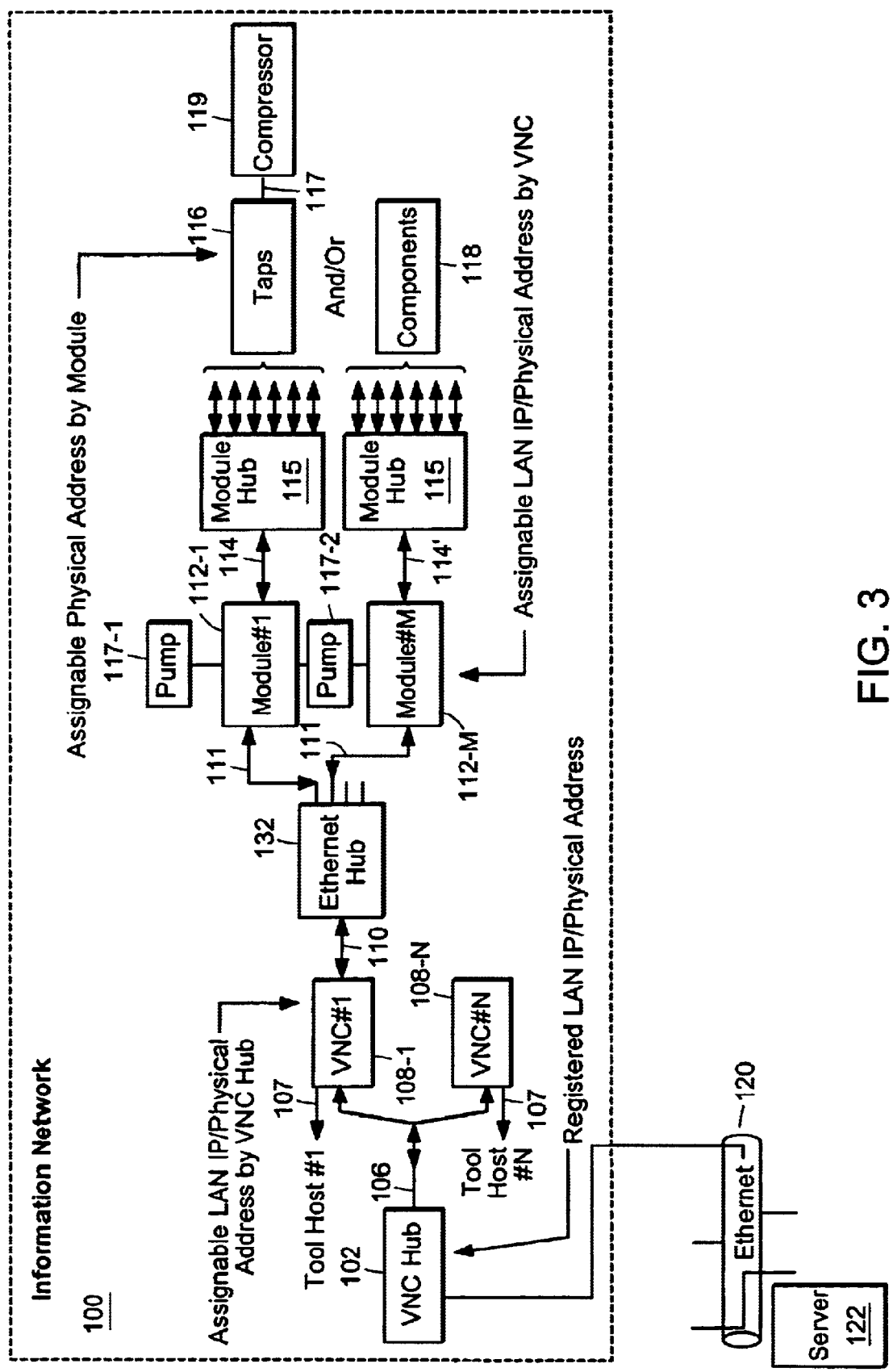
FIG. 3 is a schematic diagram of an illustrative vacuum information network of the present invention.

FIG. 3 is a schematic diagram of an illustrative vacuum information network 100 of the present invention. A vacuum network controller hub 102 serves three purposes that are highly integrated into one function.

First, the vacuum network controller hub 102 is an ethernet hub that connects to multiple VNCs 108 over a private high-speed link 106, such as TCP/IP over ethernet.

Second, the vacuum network controller hub 102 manages the interface between a registered, internet protocol (IP) physical address and the VNCs 108. That is, the entire vacuum information network 100 is assigned a single, publicly registered IP address. The vacuum network controller hub 102 communicates over a high-speed public ethernet network 120 with a server 122 using this publicly registered address. Devices inside the vacuum information network 100 are assigned private addresses that are unknown to the outside world. VNC addresses are assigned, for example, by the vacuum network controller hub 102 automatically when detected by the hub 102. Messages sent to the publicly-registered address arrive at the vacuum network controller hub 102, which then determines the intended target and routes each incoming message to the intended device.

Third, the vacuum network controller hub 102 is capable of performing supervisory control and data acquisition, i.e., monitor and control, functions.

Each VNC 108, in turn, "leases" or assigns IP physical addresses to components with which it communicates. This eliminates the need for individual address switches on the components and provides for simple installation.

Each VNC 108 communicates with a cluster tool hub 132 over an ethernet link 110. Each cluster tool hub 132 can communicate with one or more interface modules 112 such as On-Board® pump control modules over a plurality of ethernet links 111. The cluster tool hub 132 provides a simple way to connect chambers to the vacuum information network. In one embodiment, it is an eight-node scalable non-managed hub.

Each interface module 112 is typically, although not necessarily, mounted on an associated pump 117, which the interface module 112 controls through a direct interface. Each interface module 112 responds to a local IP physical address that is assigned by the interface module's corresponding VNC 108.

Each interface module 112 in turn communicates with a module hub 115 over a local module interface bus 114, which can be, for example, an RS-485-based network. The module interface bus 114 is typically slower than the ethernet LANs 106, 110, 111, 120 through which an interface module 112 communicates with VNCs 108, the vacuum network controller hub 102 and ultimately the server 120.

Each module hub 115 can communicate with some components 118 directly, and with other components 119 through taps 116. End units such as taps 116 and components 118 have physical addresses which are assigned by, for example, the corresponding interface module 112. Taps 116 allow for seamless integration of third party components and/or non-proprietary components. The taps convert signals 117 from the components 119 to the module interface bus 114 protocol. These signals 117 may be, for example, analog, digital, and serial communications. Note that additional communication taps can be added if required. No special configuration needs to be performed, because, component detection and address assignment are automatic.

Figure 4:
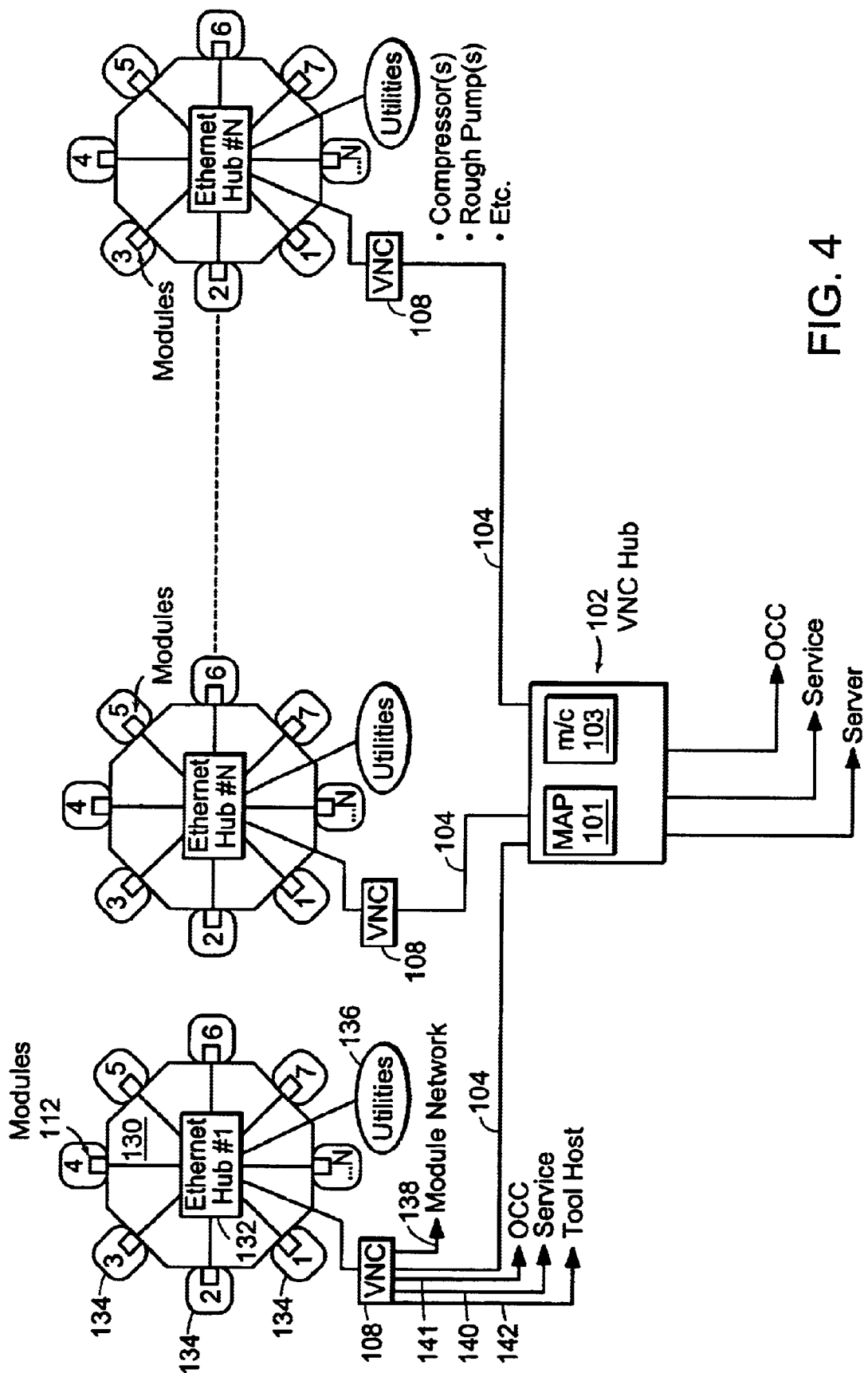
FIG. 4 is a schematic diagram of the an illustrative vacuum information network of the present invention comprising several cluster tools.

FIG. 4 is a schematic diagram of an illustrative vacuum information network comprising several cluster tools 130. Each cluster tool 130 comprises a plurality of vacuum tools or components 134. An interface module 112 is typically located at each tool 134. A cluster tool hub 132, located at each cluster tool 130, communicates with a VNC 108 that is associated with the cluster tool 130. Note that the cluster tool hub 132, in addition to communicating with a VNC 108, also communicates with other utilities 136 such as compressors, rough pumps, etc.

Each VNC 108 can also communicate with a tool host over a tool host link 142, a service terminal over a service link 140, a control center over a control center link 141 and a module network 138. In addition, each VNC 108 communicates over an ethernet link 104 to the vacuum network controller hub 102, which both acts as an ethernet hub for communicating with the other VNCs 108, and as an interface for communicating with the outside world, including a server, service and a control center.

The VNC hub 102 maintains a configuration or address map 101 that maps devices, i.e., VNCs, modules and end units, to their dynamically assigned addresses. Addresses may be assigned using a protocol such as Dynamic Host Control Protocol (DHCP). Refer to RFC 2131. The map 101 is then used to determine how to forward incoming messages.

In one embodiment, a device's dynamically assigned address is determined based on unique identification information sent by the device upon the device's initialization. Such information may include, for example, a serial number associated with the device. Each device is assigned a local address by another device higher up the network hierarchy. For example, a VNC is assigned an address by the vacuum network controller hub which transmits the address back to the VNC.

The VNC hub 102 may also contain supervisory control and data acquisition functions 103.

Figure 5:
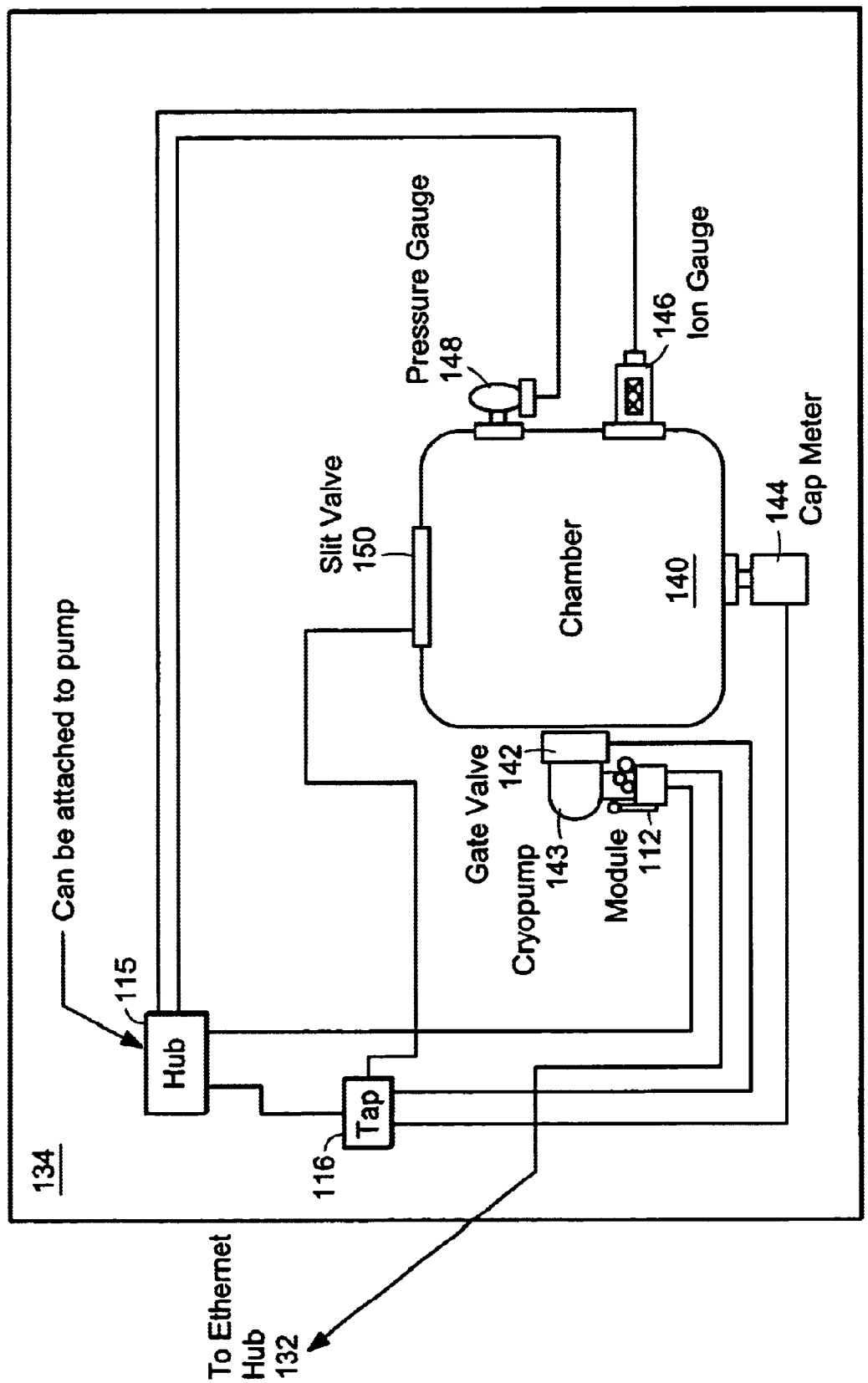
FIG. 5 is a schematic diagram showing one of the tools of FIG. 4 in more detail.

FIG. 5 is a schematic diagram showing details of one of the tools 134 of FIG. 4. The tool 134 comprises a vacuum chamber 140, to which are attached, for example, a cap meter 144, a gate valve 142, an ion gauge 146, a pressure gauge 148 and a slit valve 150. The interface module 112 is typically located on, and controls, the pump 143 (corresponding, for example, to 117-1 of FIG. 3). The interface module 112 also communicates with the cluster tool hub 132 associated with the cluster tool 130, and with the module hub 115

The module hub 115, in turn, communicates with a tap 116. In the illustrative example of FIG. 5, the tap 116 collects data from the slit valve 150, the gate valve 142 and the cap meter 144, which collectively correspond to the components 119 of FIG. 3. The module hub 115 also communicates directly with the pressure gauge 148 and the ion gauge 146, which correspond to the components 118 of FIG. 3.

Thus, the interface module 112, through the module hub 115, presents to the high-speed ethernet networks, a common, high-speed interface to all of the components and taps.

Figure 6:
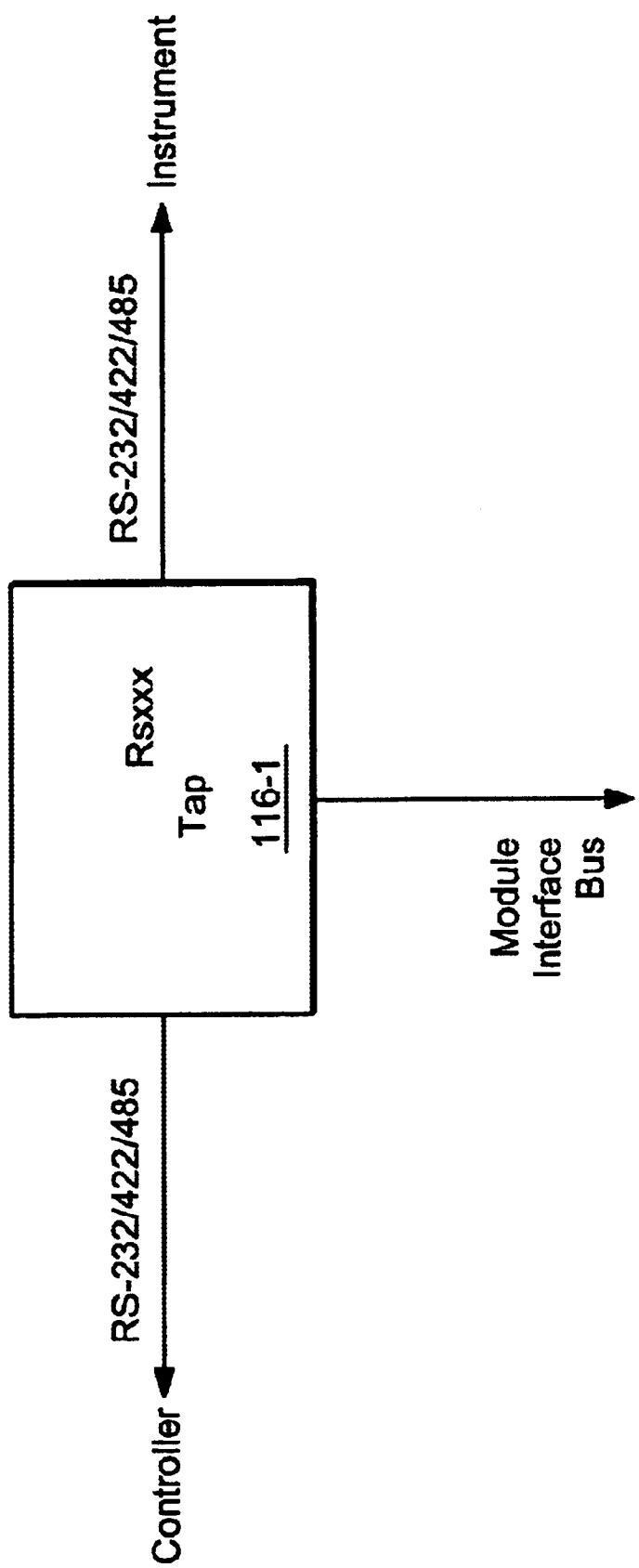
FIG. 6 is a schematic diagram of a RS-232/422/485 tap of the present invention.

FIG. 6 is a schematic diagram of an RS-232/422/485 tap 116-1, which can be inserted into an RS-232, RS-422 or RS-485 serial line between a component and its controller. The tap 116-1 is capable of converting any of the various serial formats into the protocol of the module interface bus 114 (FIG. 3), which in one embodiment comprises an RS-485 network. Even where a particular component provides an RS-485 interface, the protocol may be different than that used by the module interface bus, so that the tap will have to provide a translation function. The tap 116-1 allows both the monitoring and controlling of components to which it is connected.

The data from the component is thus made accessible over the vacuum information network.

Figure 7:
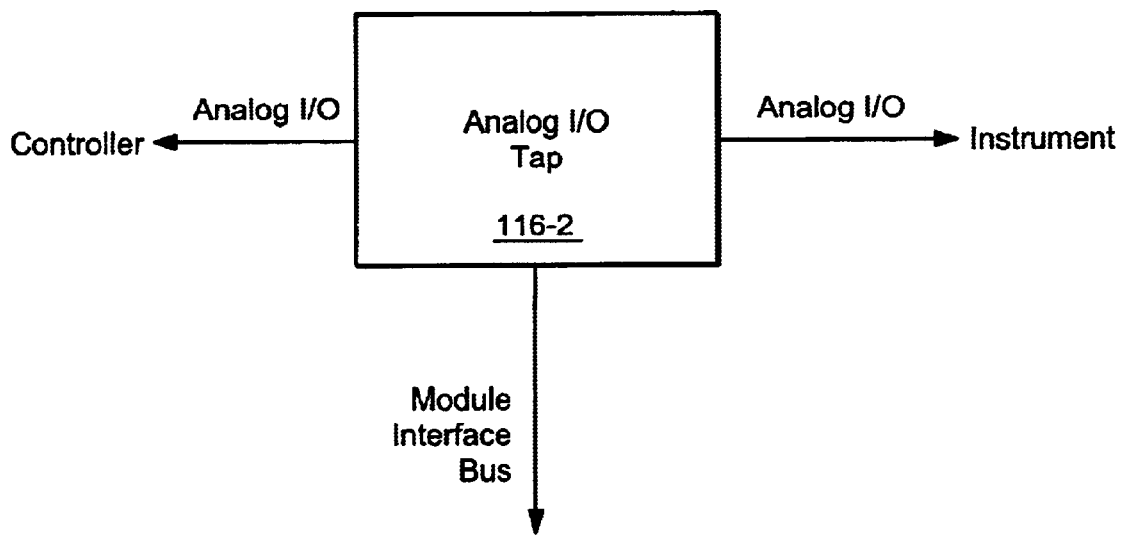
FIG. 7 is a schematic diagram of an analog tap of the present invention.

FIG. 7 is a schematic diagram of an analog tap 116-2, which is similar in function to the tap 116-1 of FIG. 6. Here, however, analog signals from a component, which are normally routed directly to a controller for that component, are captured or tapped, converted and made available to the vacuum information network. The tap 116-2 allows both the monitoring and controlling of the component through analog input and output (I/O) signals. Analog inputs might include, for example, motor currents, and temperature, pressure and accelerometer readings.

Figure 8:
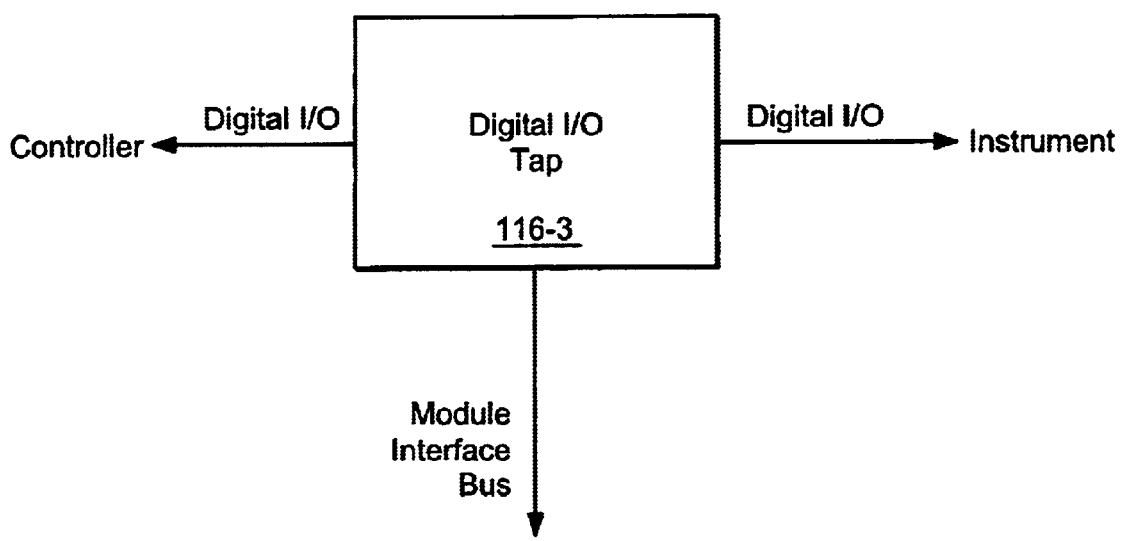
FIG. 8 is a schematic diagram of a digital input tap of the present invention.

FIG. 8 is a schematic diagram of a digital input tap 116-3, which like the other taps, is installed before an instrument being monitored to provide digital information to the vacuum information network. The tap 116-3 allows both the monitoring and controlling of the component through digital input and output (I/O) signals. For example, switches and speed sensors provide digital status indications which may be converted by the tap 116-3. Digital outputs might drive, for example, relay outputs, heaters, valves and power to gauges and motors.

Each tap 116 has a failsafe mode. That is, if for some reason, communication and/or power is lost between the tap 116 and its associated module interface 112 (FIG. 3), the tap 116 by default continues to allow communication between the controller and the instrument.

The ethernet links may be composed of various media, depending on the needs of the system. These include, but are not limited to, fiber optic links, wired links and wireless links.

The network hierarchy follows the logical device hierarchy. That is, the system has a corresponding vacuum network controller hub, while each cluster has a corresponding VNC, chambers have corresponding modules and components correspond to taps. This hierarchy allows the vacuum system information network to be quite scalable and expand easily according to the changing needs of the vacuum system.

While this invention has been particularly shown and described with references to preferred embodiments thereof, it will be understood by those skilled in the art that various changes in form and details may be made therein without departing from the scope of the invention encompassed by the appended claims.

What is claimed is:

1. A vacuum control network system, comprising:
    a vacuum network controller hub communicating over a non-local high-speed network, the hub having an address registered with respect to the non-local network, and communicating over a first local high-speed network;
    a plurality of vacuum network controllers (VNCs) communicating with the hub over the first local network, each VNC having a dynamically assigned local address and communicating with at least one interface module over a second local high-speed network; and
    at least one interface module communicating with a VNC over the second local high-speed network.

2. The system of claim 1, the at least one interface module having a dynamically assigned local address.

3. The system of claim 1, the at least one interface module communicating directly with a vacuum pump.

4. The system of claim 1, further comprising:
    at least one end unit which communicates with an interface module over a module interface bus, said end unit having a dynamically assigned address.

5. The system of claim 4, further comprising:
    at least one module hub, wherein communications between an interface module and plural end units is through the at least one module hub.

6. The system of claim 5 wherein an end unit is a tap.

7. The system of claim 6 wherein the tap connects to a component using digital I/O.

8. The system of claim 6 wherein the tap connects to a component using analog I/O.

9. The system of claim 6 wherein the tap connects to a component using a serial link.

10. The system of claim 5 wherein an end unit is a component.

11. The system of claim 10 wherein a component is a vacuum pump.

12. The system of claim 5, the vacuum network controller hub further comprising:
    a configuration map which describes those VNCs, modules and end units that the vacuum network controller hub controls.

13. The system of claim 5, wherein the at least one end unit performs a monitor/control function.

14. The system of claim 1, wherein the non-local network is a public network and the first and second local networks are private networks.

15. The system of claim 1 wherein the high-speed networks use TCP/IP over ethernet.

16. The system of claim 1 wherein at least one of the first and second local networks comprises a fiber optic network.

17. The system of claim 1 wherein at least one of the first and second local networks utilizes a wire network.

18. The system of claim 1 wherein at least one of the first and second local networks utilizes a wireless network.

19. The system of claim 1 wherein a VNC's address is dynamically assigned by the hub.

20. The system of claim 1, wherein a device's dynamically assigned address is determined based on unique identification information sent by the device upon the device's initialization, the device's assigned local address being transmitted back to the device in response, a device being one the group of: a VNC and a module.

21. The system of claim 1, wherein the vacuum network controller hub performs supervisory control and data acquisition functions.

22. The system of claim 1, wherein a VNC is associated with a cluster tool.

23. The system of claim 22, wherein a module is associated with a vacuum chamber.

24. The system of claim 1, wherein a module is associated with a vacuum chamber.

25. The system of claim 6, wherein a tap is capable of operating in a fail-safe mode.

26. A vacuum control network system, comprising:

a vacuum network controller hub communicating over a non-local high-speed network, the hub communicating over a first local high-speed network;

a plurality of vacuum network controllers (VNCs) associated with a plurality of cluster tools and communicating with the hub over the first local network, each VNC communicating with at least one module over a second local high-speed network; and at least one module associated with a vacuum chamber within a cluster tool and communicating, over the second local network, with the VNC associated with said cluster tool, each module communicating with at least one end unit over a local device network; and at least one end unit which communicates with a module.

27. A method for interconnecting a vacuum control network system, comprising:

providing a communication connection from a vacuum network controller hub to a non-local high-speed network, the hub having an address registered with respect to the non-local network;

providing communication connections between the hub and a plurality of vacuum network controllers (VNCs) over a first local high-speed network, each VNC having a dynamically assigned local address;

providing communication connections between at least one VNC and at least one module over a second local high-speed network, a module having a dynamically assigned local address; and providing communication connections between at least one module and at least one end unit over a local device network, an end unit having a dynamically assigned address.

28. A vacuum control network system, comprising:

means for connecting a vacuum network controller hub to a non-local high-speed network, the hub having an address registered with respect to the non-local network;

means for providing communication connections between the hub and a plurality of vacuum network controllers (VNCs) over a first local high-speed network, each VNC having a dynamically assigned local address;

means for providing communication connections between at least one VNC and at least one module over a second local high-speed network, a module having a dynamically assigned local address; and means for providing communication connections between at least one module and at least one end unit over a local device network, an end unit having a dynamically assigned address.

\* \* \* \* \*